(12) United States Patent
Ljung

(10) Patent No.: US 10,349,319 B2
(45) Date of Patent: Jul. 9, 2019

(54) HANDOVER PREPARATION IN A RADIO COMMUNICATIONS SYSTEM

(71) Applicant: Sony Corporation, Tokyo (JP)

(72) Inventor: Rickard Ljung, Helsingborg (SE)

(73) Assignee: Sony Corporation, Tokyo (JP)

(*) Notice: Subject to any disclaimer, the term of this patent is extended or adjusted under 35 U.S.C. 154(b) by 46 days.

(21) Appl. No.: 14/696,824

(22) Filed: Apr. 27, 2015

(65) Prior Publication Data

US 2016/0119829 A1 Apr. 28, 2016

Related U.S. Application Data

(63) Continuation-in-part of application No. PCT/EP2014/072772, filed on Oct. 23, 2014.

(51) Int. Cl.
*H04W 36/00* (2009.01)
*H04W 24/02* (2009.01)
*H04W 36/08* (2009.01)
*H04W 36/30* (2009.01)
*H04W 88/02* (2009.01)
*H04W 88/08* (2009.01)

(52) U.S. Cl.
CPC ....... *H04W 36/0061* (2013.01); *H04W 24/02* (2013.01); *H04W 36/0085* (2018.08); *H04W 36/08* (2013.01); *H04W 36/30* (2013.01); *H04W 88/02* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 2012/0040679 | A1* | 2/2012 | Worrall | H04W 36/02 455/437 |
| 2014/0148174 | A1* | 5/2014 | Teyeb | H04W 36/0083 455/441 |
| 2016/0007243 | A1* | 1/2016 | Park | H04W 36/0033 370/331 |

* cited by examiner

*Primary Examiner* — Peter Chen
*Assistant Examiner* — Jeff Banthrongsack
(74) *Attorney, Agent, or Firm* — Tucker Ellis LLP

(57) ABSTRACT

A method for preparing handover of a mobile device from a serving base station in a radio communications system, includes sending an identity indicator of the mobile device, from the serving base station to a plurality of neighboring bases stations; receiving, from at least a subset of said neighboring base stations, detection data representing the respective base station's ability to detect the mobile device; sending cell identity data, from the serving base station to the mobile device, representing at least candidate base stations for the mobile device to monitor.

18 Claims, 3 Drawing Sheets

HANDOVER PREPARATION IN A RADIO COMMUNICATIONS SYSTEM

CROSS REFERENCE TO RELATED APPLICATION

This application is a continuation-in-part of International Application No. PCT/EP2014/072772, filed Oct. 23, 2014, the disclosure of which is hereby incorporated herein by reference.

FIELD OF THE INVENTION

The present invention relates to radio communications systems, and particularly to a method and a base station for preparing for handover in such a system.

BACKGROUND

In a mobile communications system, the total system coverage is typically deployed by means of many different cells. This is denoted a cellular system. For large coverage areas so-called macrocells are used, providing macro network coverage. Such macro-cellular systems have reached maturity and operators in many countries are reaching the maximum price/performance benefit for this type of infrastructure within their cellular networks. Smaller cells are already being used in certain parts of radio communications systems, providing smaller area coverage and capacity requirements. Such smaller cells may be used to extend coverage in areas where the macrocell network is weak or not available, such as near the cell edges, in urban valleys, inside buildings, etc. In addition, smaller cells may be employed to add spectrum capacity where the macrocell network is congested or overloaded. In such areas, which may be more focused on offering higher system capacity the macro network, smaller cells may thus typically be deployed within areas where macro coverage is already available. Dependent on e.g. the offered cell size, such smaller cells may for example be denoted as microcells, picocells or femtocells. A radio communications network with such a mixed cell size network topology using overlapping cells is sometimes referred to as a heterogeneous network.

Due to increasing capacity demands, a further densification of network cells compared to today can be envisioned. This could result in areas with a significant amount of deployed small cells. One result of such deployment is that a single mobile device located in that area will at certain positions be able to detect signals from base stations of many different cells. The principle of both active mode and idle mode cell selection in many cellular standards, e.g. the 3GPP standards for WCDMA and LTE, are based on mobile device detection of base station signals. Each device will experience the received signals differently, e.g. due to different positions in a cell, and based on the experienced signal quality it may select a suitable cell for camping. More importantly, the device will also provide the serving base station with information to base potential handover decisions on. The base station to which the mobile device is currently connected may be referred to as the serving base station or cell. The serving base station stores, or otherwise has access to, a neighbour cell list. This represents a list of at least the most nearby cell base stations. This cell is transmitted from the serving base station to the mobile device, and at least during active mode each mobile device must report information to the serving base station about each detected cell among the cells in that list.

SUMMARY OF THE INVENTION

It is realized that in a dense heterogeneous network, mobile device measurements, and reporting related to each of the detected cells, may put a high burden on the mobile device, as well as on the system. The mobile device will need to conduct a significant amount of neighbour cell measurements, and the system may have to schedule a large amount of measurement time gaps in order for the device to handle the measurements. This may lead to higher power consumption and lower available user data rates for mobile devices operating in the system. A feature of the invention is thus to offer an improved method and system for signalling in a dense cellular network, in which mobile devices may be capable of detecting a plurality of base station at a given point.

According to a first aspect, this feature is targeted by means of a method for preparing handover of a mobile device from a serving base station in a radio communications system, comprising the steps of sending an identity indicator of the mobile device, from the serving base station to a plurality of neighbouring bases stations;

receiving, from at least a subset of said neighbouring base stations, detection data representing the respective base station's ability to detect the mobile device;

sending cell identity data, from the serving base station to the mobile device, representing at least candidate base stations for the mobile device to monitor.

In one embodiment, said detection data is received in response to sending a detection request to said plurality of neighbouring bases stations.

In one embodiment, said step of sending a detection request is carried out in response to the step of receiving data from the mobile device, indicating an unsatisfactory signal level from the serving base station.

In one embodiment, detection data is received periodically in response to sending said identity indicator to said plurality of neighbouring bases stations.

In one embodiment, the step of sending an identity indicator is carried out to each base station of a predetermined list of neighbouring base stations located in the vicinity of the serving base station.

In one embodiment, the step of sending identity data of a plurality of mobile devices currently served by the serving base station to said plurality of base stations, which identity data includes said identity indicator.

In one embodiment, said cell identity data comprises data representing a value indicator, dependent on said detection data, for at least a number of said neighbouring base stations.

In one embodiment, said cell identity data comprises a value indicator for each neighbouring base stations of said list.

In one embodiment, said cell identity data comprises value indicators for said subset of neighbouring base stations.

In one embodiment, the method comprises the steps of
evaluating said detection data to determine suitable candidates for handover;
sending cell identity data only for determined candidate base stations.

In one embodiment, said cell identity data comprises a value indicator for at least some of the candidate base stations.

In one embodiment, the received detection data comprises a measurement on signal quality or signal strength, as detected by the base station sending the detection data.

In one embodiment, said value indicator represents a level of signal quality or signal strength.

According to a second aspect, the stated feature is targeted by means of a base station in a radio communications system, comprising a radio transceiver for radio communication with mobile devices, a communications network for communication with other base stations of the system, and a control system configured to send data representing an identity indicator for a mobile device to a plurality of said neighbouring bases stations; to receive, from at least a subset of said neighbouring base stations, detection data representing the respective base station's ability to detect the mobile device; and to send cell identity data to the mobile device, representing candidate base stations for the mobile device to monitor.

In one embodiment, the base station is configured to receive said detection data in response to sending a detection request to said plurality of neighbouring bases stations.

In one embodiment, the base station is configured to send an identity indicator to each base station of a predetermined list of neighbouring base stations located in the vicinity of the serving base station.

In one embodiment, the base station is configured to send identity data of a plurality of mobile devices currently served by the serving base station to said plurality of base stations, which identity data includes said identity indicator.

In one embodiment, said cell identity data comprises data representing a value indicator, dependent on said detection data, for at least a number of said neighbouring base stations.

In one embodiment, the base station is configured to evaluate said detection data to determine suitable candidates for handover; and to send cell identity data only for determined candidate base stations.

In one embodiment, said cell identity data comprises a value indicator for at least some of the candidate base stations.

BRIEF DESCRIPTION OF DRAWINGS

Various embodiments of the invention will be described below with reference to the accompanying drawings, in which.

DETAILED DESCRIPTION OF EMBODIMENTS

Figure 1:
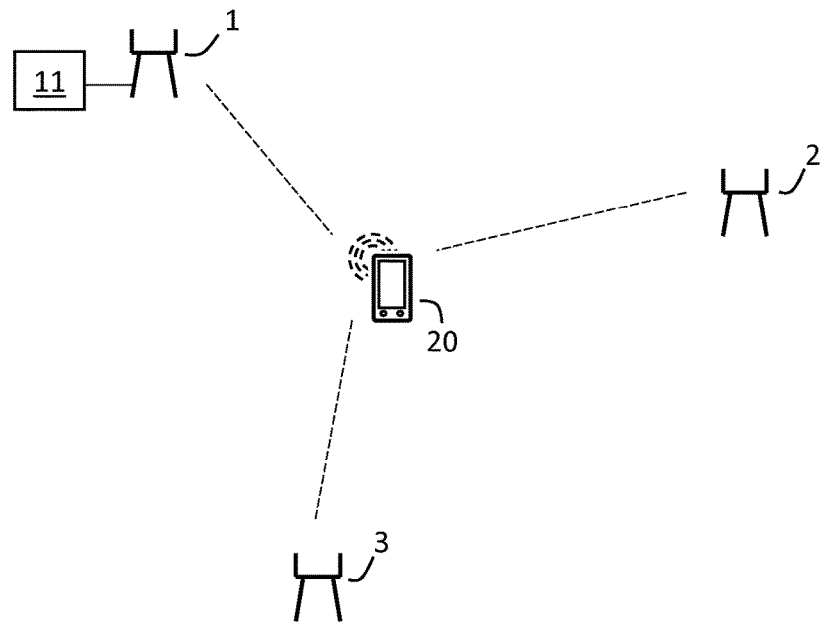
FIG. 1 illustrates a macrocell radio communications network, comprising a number of base stations and a mobile station.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In some instances, detailed descriptions of well-known devices, circuits, and methods are omitted so as not to obscure the description of the present invention with unnecessary detail.

The functions of the various elements including functional blocks, including but not limited to those labelled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) (ASIC), and (where appropriate) state machines capable of performing such functions. In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

In a typical cellular radio system, mobile devices (also known as mobile stations, wireless terminals and/or user equipment units (UEs)) communicate via a radio access network (RAN) with one or more core networks. The radio access network (RAN) covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by a cell identity within the local radio area, which is broadcast in the cell. Another identity identifying the cell uniquely in the whole mobile network is also broadcasted in the cell. The base stations communicate over the air interface operating on radio frequencies with the mobile device within range of the base stations.

In some versions of the radio access network such as the third generation Universal Mobile Telecommunications System (UMTS), several base stations are typically connected (e.g., by landlines or microwave) to a controller node (such as a radio network controller (RNC) or a base station controller (BSC)) which supervises and coordinates various activities of the plural base stations connected thereto. The radio network controllers are typically connected to one or more core networks.

In the Third Generation Partnership Project (3GPP), telecommunications suppliers propose and agree upon standards for third generation networks and UTRAN specifically, and investigate enhanced data rate and radio capacity. The 3rd Generation Partnership Project (3GPP) has developed specifications for the Evolved Universal Terrestrial Radio Access Network (E-UTRAN). The Evolved Universal Terrestrial Radio Access Network (E-UTRAN) comprises the Long Term Evolution (LTE) and System Architecture Evolution (SAE). Long Term Evolution (LTE) is a variant of a 3GPP radio access technology wherein the radio base station nodes are connected to a core network (via Access Gateways, or AGWs) rather than to radio network controller (RNC) nodes. In general, in LTE the functions of a radio network controller (RNC) node are distributed between the radio base stations nodes (eNodeB's in LTE) and AGWs. As such, the radio access network (RAN) of an LTE system has an essentially "flat" architecture comprising radio base station nodes without reporting to radio network controller (RNC) nodes.

In cellular telecommunications, the term "handover" refers to the process of transferring an ongoing call or data session involving a wireless terminal from one node, channel, or radio access technology to another node, channel, or radio access technology. For example, a wireless terminal participating in an ongoing call or data session handled by a first or source base station may have the call or session handed over to a second or target base station when measurements from the wireless terminal indicate that it would be appropriate or beneficial for such handover to occur.

It may be noted that the present invention as described herein is not limited to UMTS or LTE, nor to any type of 3GPP mobile communications systems. These types of network systems are merely discussed so as to give examples of different frameworks, within which the invention may be employed. So, despite the specific terms used in the aforementioned systems, the term base station will be used in the following for generally denoting a radio station serving one cell. Also, as is commonly known in the art of mobile communications, the logical term cell is occasionally used instead of base station, although the skilled person will understand that the communication as such is carried out by the base station of that cell. Several base stations are normally connected in a network, and are employed for radio communication with mobile devices.

FIG. 1 shows a part of a mobile communications system, comprising three base stations 1, 2, 3. A mobile device 20, such as a mobile telephone, computer, surf pad, vehicle or similar, may move within the system, maintaining connection with one or more of the base stations 1, 2, 3. Normally, the mobile device 20 may be communicatively connected to one serving base station 1 at a time, while still being configured to make measurements of other cell base stations 2, 3. The measurement results are then communicated to the network through the serving base station 1. A decision may be taken in the network to hand over the mobile device 20 from the serving base station 1 to another base station, e.g. in response to the determination that the present level of service between the mobile device 20 and the serving base station 1 is inferior. Dependent on the specific type of radio communications system, this decision may be taken in a control system 11, within or connected to the base station 1. The control system 11 may comprise a microprocessor and a memory containing computer program code, and is configured to carry out the steps related to the base station 1 as described for various embodiments herein. Control system 11 is left out in the other drawings for the sake of simplicity, but is preferably included in all embodiments described herein. Furthermore, though not shown, corresponding control systems may also be included in other base station 2, 3, of the system.

FIG. 1 illustrates a state of the art situation, comprising a plurality of so-called macro cells 1, 2, 3. In such a system the mobile device 20 may move rather freely within a large area without requiring handover. However, the mobile device 20 will normally make measurements of signals from other cells, i.e. from the base stations 2, 3 of those other cells, and report to the network through the serving base station 1. In a state of the art system as that of FIG. 1, where the cells cover a fairly large area, the number of different cell signals the mobile device 20 may have to monitor is limited. Since the base stations normally are stationary, the spatial distribution of base stations is substantially fixed. A list of neighbour cells or base stations 2, 3 may thus be stored in a base station 1, or otherwise be available to the base station through the network. Such a list of neighbour cells or base stations may be communicated from the serving base station 1 to the mobile device 20. The neighbour cell list may e.g. comprise a list of frequencies of pilot signals transmitted by the neighbour base stations, which pilot signals may be used for signal strength measurements by the mobile device 20. In an alternative embodiment, each cell may be represented by a code, indicating where in a certain radio frame or similar the corresponding base station transmits. This way, control circuitry in the mobile device 20 will be able to determine which base station or cell signals to listen to.

Figure 2:
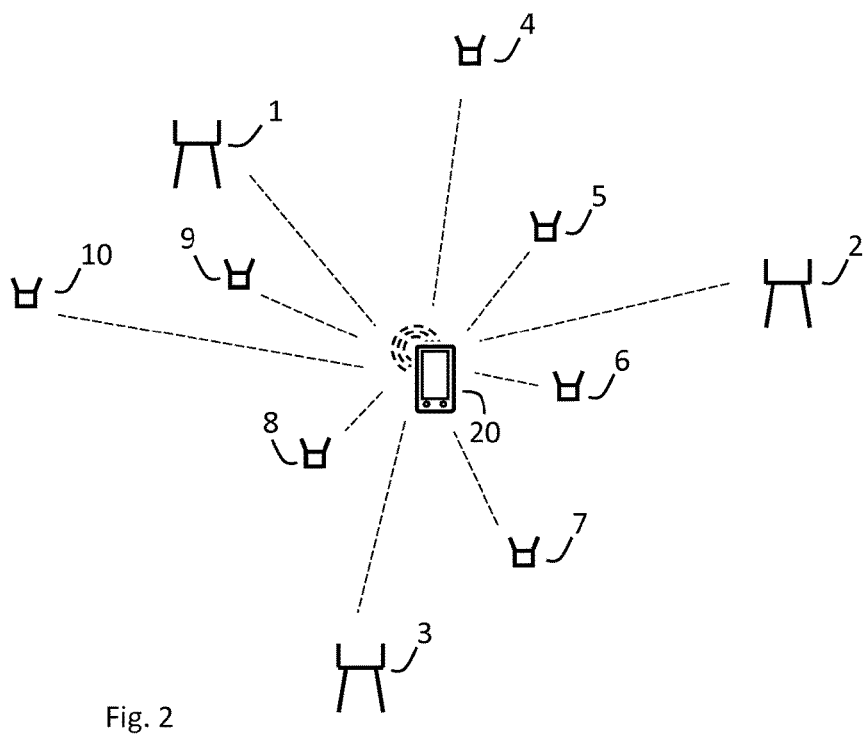
FIG. 2 illustrates a more heterogeneous network including a plurality of smaller cells.

FIG. 2 illustrates a scenario in which a large number of cells occupy a comparatively limited area. Or, in other words, the distance between neighbouring base stations is substantially shorter than in a macrocell network of FIG. 1. In addition to a number of macrocells 1, 2, 3, such a system may comprise a plurality of smaller cells 4-10, e.g. microcells, picocells or femtocells. In such a heterogeneous network, the serving base station 1 will typically have a large number of neighbour cells. This also means that the list of neighbour cells for a base station 1 may be a lot more extensive, than in the scenario of FIG. 1. Rather than having to make measurements on a few cells, e.g. ten cells, a mobile device 20 in such a coverage area may have to listen to and measure on 30 or 40 base station signals. This will increase the required time and processing power in the mobile device 20 for the measurement cycles, and will also require more space in the air interface, for reporting up to the network via the serving base station 1.

Figure 3:
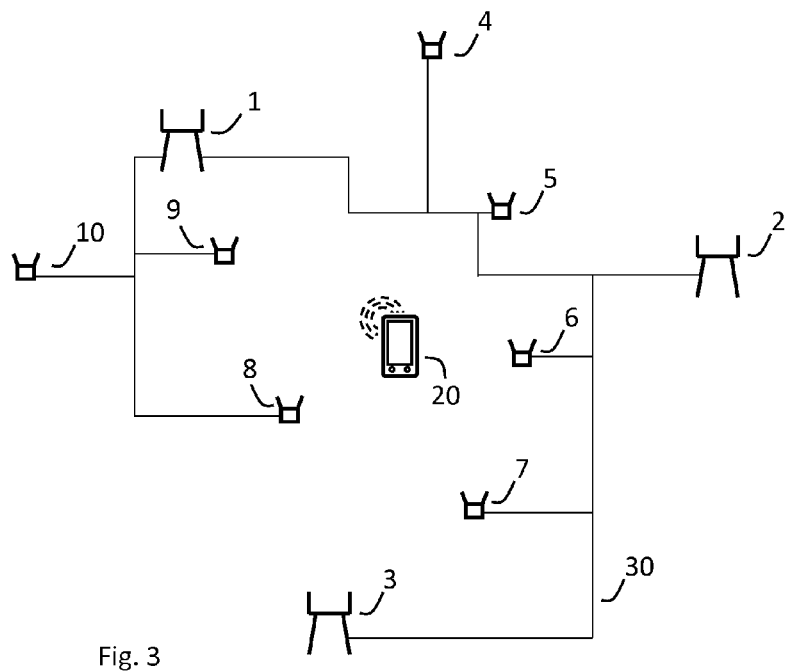
FIG. 3 schematically illustrates the stationary network of base stations in the embodiment of FIG. 2.

An attempt to solve this drawback is illustrated in the subsequent drawings. In this proposal, instead of the mobile devices being responsible to measure all candidate cells in the neighbour cell list and report measurements of all detected cells, the network is expected to conduct device detection in order to limit the set of candidate cells. In FIG. 3, a public land mobile network (PLMN) 30 is schematically illustrated, in a system corresponding to that of FIG. 2. The PLMN 30 interconnects the various base stations of the radio communications system, and may of course include further bases stations, control stations, gateways etc., dependent on the specific type of telecommunications system.

In one embodiment, a separate indication is provided by a serving cell, as of what neighbour cells within the neighbour cell list that currently has detected the mobile device, or is otherwise deemed capable of offering sufficient service level. The mobile device will subsequently only be expected to measure and report received signal strength from these cells.

In one embodiment, a serving base station 1 may be configured to implement a control function that requests other cells of the system to conduct device detection measurements. For a certain mobile device 20, connected to a serving base station 1, there is an identity indicator allocated. This identity indicator may e.g. be a C-RNTI (cell-radio network temporary identity) in the example of a 3GPP system. Alternatively, the identity indicator could be a unique identity for each mobile device in the system. In any case, this identity indicator enables uplink signals from each device within a cell to be distinguished from each other, and this identity indicator is transferred to base stations of said other cells of the system, which at least includes neighbour base stations 2-10, for the purpose of subsequent device detection by those other base stations. By neighbouring base stations, base stations serving cells located in the vicinity of the serving base station 1 are meant. Detection data, representing the respective base station's ability to detect the mobile device 20, is subsequently received from at least a subset of the neighbouring base stations 2-10, related to device detection of the mobile device 20 conducted in the respective neighbour cell. The serving base station 1 is furthermore configured to send cell identity data to the mobile device 20, representing at least candidate cells for the mobile device 20 to monitor. Dependent on the specific embodiment, the serving cell 1 may e.g. be configured to specifically mark all cells detecting a mobile device in a neighbour list transmitted to the mobile device 20. In an alternative embodiment, the serving base station, or another network entity connected to the base station 1, may be configured to make a selection from among the neighbour cell list, e.g. based on received signal strength detected at the neighbour base stations 2-10, so as to transmit a shortened neighbour cell list to the mobile device 20.

Figure 4:
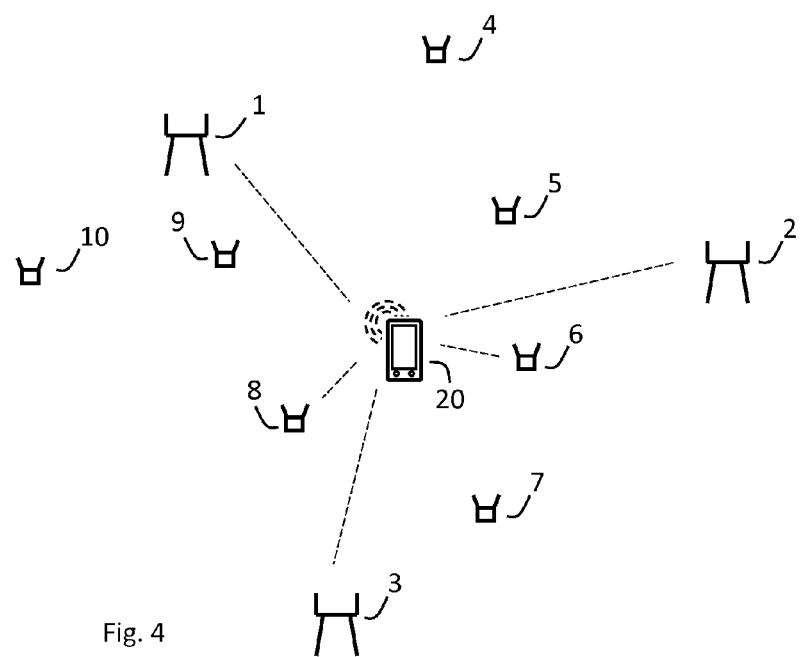
FIG. 4 illustrates signalling with candidate cells in an embodiment of a radio communications network.

FIG. 4 illustrates an effect of the proposed solution. Irrespective of the specific way of realizing the proposed procedures, the resulting effect will be that the instructions received from the serving base station 1, or interpreted from the data received in the mobile device 20, will cause the mobile device 20 to conduct measurements on a set of candidate base stations, which may be shorter than the actual neighbour cell list. In a macrocell area, such as that of FIG. 1, the result may not be different from simply sending the entire neighbour cell list to the mobile device 20. However, in a heterogeneous system such as the one in FIG. 2, the set of candidate base stations may constitute a limited version of the neighbour cell list, even a substantially limited version. In the example of FIG. 4, the mobile device will at the present time and place be configured to make measurements on five base stations, or cells, 1-3, 6, 8, rather than ten, as in the scenario of FIG. 2.

Actual handover of the mobile device 20 will normally be decided, and controlled, by the network 30. This may work differently dependent on whether the mobile device is in an idle mode or in an active more, i.e. occupied in a communications session. When the mobile station is connected to the network 30, it will nevertheless make measurements on a number of detected base stations, e.g. by measuring the signal strength of a pilot signal for each of those cells. When the connection to the serving base station 1 decreases below a certain level, handover may be appropriate. This may be assessed in the mobile station, by experiencing a poor link to the serving base station, whereby the mobile device 20 signals to the serving base station that handover may be suitable. In an alternative embodiment, the mobile device simply signals measurement values to the serving base station 1, whereby analysis and potential assessment that handover may be suitable is carried out in the network 30, e.g. in the serving base station 1. Nevertheless, it is typically determined that handover may be suitable based on the data received from the mobile device 20, indicating that the current connection is insufficient.

The process of obtaining detection data, representing the ability of neighbour base stations to detect the mobile station 20, may be controlled in different ways. In one embodiment, the serving base station is responsible for reporting the connection or presence of mobile station 20 to all its neighbour base stations 2-10. This report, including the identity indicator for the mobile device 20, may be transmitted once the mobile station 20 connects to the base station 1, and/or periodically during connection to the base station 1. The serving base station may in one embodiment address all its neighbouring base stations 2-10 when sending the identity indicator of the mobile device 20. In an alternative embodiment, the neighbouring base stations 2-10 may be addressed separately, and the identity indicator for the mobile device 20 may be sent at separate instances to different base stations 2-10. A step of sending the identity indicator of the mobile device 20, from the serving base station to a plurality of neighbouring bases stations may thus be carried out in separate sub steps.

In one embodiment, the reporting of the connection of mobile device 20 to the serving base station 1, initial or continued, may in itself constitute a detection request. In other words, when the base stations 2-10 on the neighbour cell list for the serving base station 1 receive the identity indicator of mobile device 20, the receiving base stations 2-10 are thus configured to listen to the mobile device 20. As an example, the base stations 2-10 may be configured to listen to a certain frequency, timeslot, code or pattern associated with the mobile device 20. In one embodiment, the base stations 2-10 may be configured to listen to a signal including or representing the C-RNTI associated the mobile device 20, transmitted by that mobile device 20. This identifier is cell specific, and the cell 1 in which the mobile device 20 is served, may share this C-RNTI and ask other cells 2-10 to listen for it. The neighbouring base stations 2-10 may be configured to send detection data to the serving base station 1, where the data is received. In one embodiment, detection data is received periodically in the serving base station, from each one neighbouring base station 2-10, in response to sending said identity indicator. The periodical receipt may be in response to periodical transmission of the identity indicator of the serving base station 1. Alternatively, receipt in the neighbouring base station 2-10 of a single transmission of the identity indicator for the mobile device 20 from the serving base station 1, may configure the neighbouring base stations 2-10 to periodically listen to the mobile station 20, and thereafter to report detection data to the serving base station 1. In such an embodiment, the sending of the identity indicator for the mobile device 20 constitutes a detection request.

In one embodiment, reporting of the identity indicator of the mobile device 20 is separate from an actual transmission of a detection request, from the serving base station or other handover control entity connected in the network 30, to said plurality of neighbouring bases stations. In such an embodiment, the identity indicator need only be reported once from the serving base station 1. The detection request may in this embodiment thus be a separate instruction sent out from the serving base station 1 to its neighbouring base stations 2-10, subsequent to or simultaneously with transmission of the identity indicator for a connected mobile device 20.

It may be noted that, regardless of whether the detection request is a separate signal from the serving base stations 1 to the neighbouring base stations 2-10, or if it is implicit with the sending of identity indicator of the mobile device 20, the step of sending a detection request may be carried out in response to receiving data from the mobile device 20, indicating an unsatisfactory signal level from the serving base station 1. This may thus be, the initiating step for detecting candidate cells for the mobile station 20.

At any given time, the serving base station 1 may have a number of mobile devices connected (only the one mobile device 20 shown). In such a scenario, a detection request may be a single signal issued to all neighbouring base station to conduct measurements by listening to each one of the currently connected, and thus reported, mobile stations. In response thereto, those neighbouring base stations 2-10 will listen for the mobile stations for which they have received identity indicators, and report back to the serving base station 1, where this data is received through the network 30. Alternatively separate detection request signals may be sent to the various neighbouring base stations 2-10. The transmission of a detection request in this embodiment, may be periodical, or it may be transmitted in response to the assessment that handover may be suitable, based on data received by the serving base station 1 from the mobile station 20.

The serving base station may, in addition, be configured to report when connection is lost to the mobile device 20, e.g. if the mobile device is switched off, so as to inform the neighbouring base stations of this scenario. Otherwise, if the mobile device 20 is handed over to another base station, this effect may be reported by the previously serving base station 1 to it neighbouring base stations, by the new serving base station to its neighbouring base stations, or both.

The controlling of the mobile device 20 to monitor only a subset (meaning all or less than all) of the base stations 2-10, neighbouring the serving base station 1, may be realized in different ways. Intelligence and control is preferably configured in the network 30, but the mobile station 20 may be involved to a certain level too, dependent on embodiment. Furthermore, even when configured in the network 30, it may be predominantly carried out in the serving base station 1, or with part of the control steps executed in the neighbouring base stations.

Neighbouring base stations 2-10 that are in fact capable of detecting the mobile device 20 in response to a detection request, will report back to the serving base station 1. Reporting back may be executed by sending data within a certain period for responding, which may be given in the detection request or be pre-configured, and/or by means of using a certain layer or channel. The data sent may be of different character, dependent on how the system is realized. In one embodiment, the data sent back to the serving base station 1 is basically raw data, i.e. a measurement of signal strength as detected from the mobile station 20. In another embodiment, the data reported back to the serving base station may be a parameter value determined in the detecting neighbouring base station, representing a level of signal strength as detected. In one embodiment, the data may include different sub data, representing different aspects of the detected signal from the mobile station 20, e.g. corresponding to a static level, to dynamic behaviour of the detected signal, interference, etc.

In one embodiment, it may be the case that certain of the neighbouring base stations 2-10 are in fact not capable of detecting the mobile device 20. This may e.g. be the case for smaller cells, such as femtocells, or for cells that are simply too remote from the mobile station 20. This result be established by the serving base station 1 by means of a specific report back from the neighbouring base station in question, in response to the detection request, which report back includes data that represents no signal detected. Alternatively, if no data is reported back in the way or time as intended, the serving base station 1 may deem that no signal was detected from the mobile station 20 from that specific base station.

In one embodiment, the serving base station is configured to control which base stations qualify as candidate base stations. The serving base station 1 receives, from at least a subset of the neighbouring base stations 2-10, detection data representing the respective base station's ability to detect the mobile device 20. The serving base station 1 is thereafter configured to send cell identity data, representing at least candidate base stations for the mobile device to monitor, to the mobile device. The cell identity data may e.g. include a pilot signal frequency, a slot time, a channel indicator, a certain bit or bits of a frame, or other identifiable signal characteristic for the candidate base station in question.

In one embodiment, all neighbouring base stations which have reported data back to the serving base station 1, corresponding to the detected signal quality or strength from the mobile station, are deemed to constitute candidate cells by the serving base station 1. In this embodiment, the neighbouring base stations 2-10 may be configured to report a value back to the serving base station 1 if the mobile device 20 is detected, corresponding to the quality or strength of a detected signal from the mobile device 20.

In one embodiment, the neighbouring base stations 2-10 may be configured, either pre-configured or by means of data in the detection request from the serving base station 1, to report back to the serving base station 1 only if the detected signal from the mobile station 20 exceeds a certain level, e.g. a signal strength level, or to report back a null value if the said certain level is not exceeded. In such an embodiment, the neighbouring base stations are thus partly involved in the determination of which base stations qualify as candidates.

The cell identity data sent to the mobile station 20 may comprise data representing a value indicator for at least a number of the neighbouring base stations 2-10, preferably also including the serving base station 1. This may be achieved in different ways, dependent on embodiment. In one variant of this embodiment, the value indicator is taken from the data reported from the neighbouring base stations 2-10, or based thereon, e.g. a parameter value based on the reported value. In such an embodiment, the quality of each candidate cell may be graded. In another variant of this embodiment an assessment is made, e.g. in the serving base station 1 or in another entity connected to the serving base station 1 in the network 30, based on the data reported from the neighbouring base stations. As an example, only cells in which a signal strength exceeding a certain level are deemed to qualify as candidates.

In one embodiment, an entire list of all neighbour base stations of the serving base station 1 is transmitted to the mobile station 20. In such an embodiment, that list may include cell identity data, such as pilot signal frequency, for each cell on the list, but also an indication in that list, or related to that list, of which cells to monitor, i.e. the candidate cells. That indication may be a simple binary code, pointing out which cells to monitor and which to disregard. As an alternative, said value indicator may be given for the cells in the neighbouring base stations of said list.

In an alternative embodiment, only cell identity data for a portion of the base stations 2-10 on the neighbour cell list is sent to the mobile device 20. In one embodiment, cell identity data is sent for the entire subset of base stations, from which a response is received to the serving base station 1, in response to the detection request. In another embodiment, cell identity data is sent only for those base stations which are deemed to be suitable candidates.

In yet another embodiment, in which the mobile device 20 takes part in the control of the process, only data related to the measured signal level at the neighbour base stations 2-10, and preferably also the serving base station 1, are sent to the mobile device 20 from the serving base station. A determination of which of those cells are suitable candidate cells is assessed in the mobile device 20, e.g. by selecting only those cells with a signal strength measured to exceed a certain level. Only those base stations will then be monitored as candidate cells.

Most embodiments outlined above cover a situation where the selection of suitable candidate cells in some sense originates in the identity of the mobile device 20 or devices currently served by that base station 1. It should be noted, though, that the proposed solution also may be embodied around the notion of information of currently served mobile devices in the various cells of the system being shared in the network 30. In one such embodiment, neighbouring cell base stations 2-10 of a certain base station 1 may be requested by the serving base station 1, or preconfigured in the network 30, to periodically report identity indicators, e.g. C-RNTIs, of all mobile devices detected by that neighbouring base station, or at least those mobile devices having a detected signal quality or level exceeding a certain level. The reported data from that neighbouring base station can then be compared to a list of currently served mobile devices in the receiving base station 1, and only for those mobile devices 20 served, cell identity for candidate cells will be sent from the serving base station 1.

One benefit from the approach of the solution proposed herein is to be able to significantly reduce the amount of required neighbour cell measurements in a mobile device 20 during active mode in a dense heterogeneous network, as indicated in FIG. 4. With the proposed approach the burden of the mobile devices in a heterogeneous network will be reduced, saving system capacity and mobile device power consumption.

Figure 5:
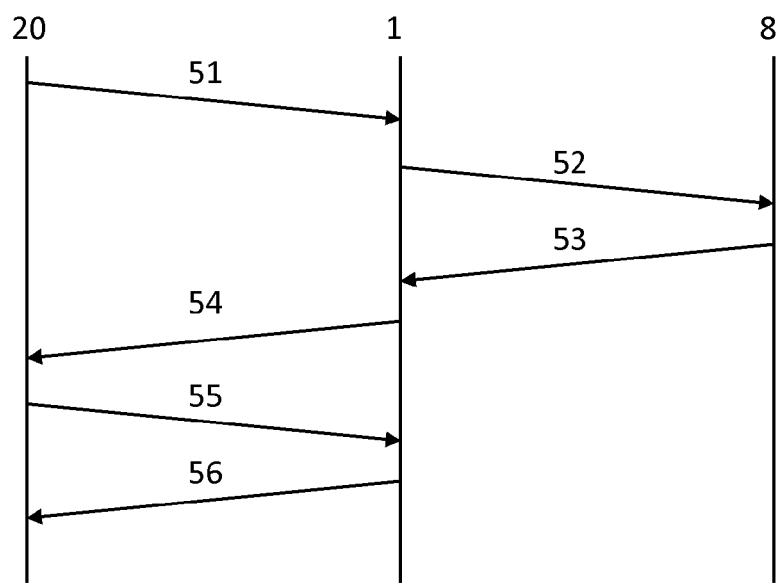
FIG. 5 illustrates different steps of signalling between different base stations and a mobile device in a radio communications network.

FIG. 5 shows an example of signalling diagram for how the functionality could work from an overall perspective, in an embodiment of the invention. It will be understood from the foregoing, and specifically with regard to the description of alternative embodiments, and with regard to which data is reported between the base stations 1 and 2-10, and what data is included in the data sent to the mobile device 20 from the serving base station 1, that variants of the embodiment of FIG. 5 fall within the scope of the solution proposed herein.

In FIG. 5 a mobile device 20 is illustrated to the left, its currently serving base station 1 is shown in the middle, and to the right a neighbour base station 8 is shown.

In step 51, an event report is sent from the mobile device 20 to its serving base station 1. The event report may indicate that the connection to the serving base station 1 is getting weak, thus that handover should be contemplated, or at least that neighbour cell measurements may be applicable.

In step 52, the serving base station 1 sends a detection request to the neighbouring base station 8. This request implies that the neighbouring base station 8 shall measure a signal emitted from the mobile device 20. The identity indicator, e.g. a C-RNTI, of the mobile device 20 may form part of the detection request. Alternatively, the identity may have been sent beforehand, and the detection request may be a request for measurements to be carried out for all devices for which an identity indicator has been sent.

In step 53, detection data is received in the serving base station 1 from the neighbouring base station 8. The detection data may include the measured signal level of the mobile device 20, or a value representing the outcome of that measurement.

In step 54, the serving base station 1 sends cell identity data, to the mobile device 20, representing at least candidate base stations 8 for the mobile device to monitor. The mobile station subsequently makes signal measurements on candidate base stations 8, while ignoring to make measurements on other base stations.

In step 55, the mobile station 20 reports measurement responses to the serving base station 1, e.g. representing measurements made on pilot signals from the candidate base stations 8, as quality indicators.

In step 56, a handover request is sent by the serving base station 1 to the mobile device 20. This is preceded by a decision on handover, taken in the network 30, e.g. in the serving base station 1, based on the quality indicators sent in step 55.

Handover as such does not form part of the proposed solution, and may be performed in accordance with the state of the art, e.g. as under specified in the 3GPP specifications for UMTS and LTE. However, while the invention has been discussed in the foregoing on a general level, and with respect to certain embodiments, the references given to 3GPP networks and specifications shall be understood as non-limiting examples of radio communications systems. Furthermore, the skilled person will realize that where not contradictory, the disclosed embodiments above may be combined in various combinations.

The invention claimed is:

1. A method for identifying base station handover candidates from a plurality of base stations neighbouring a serving base station in a heterogeneous radio communications network for a mobile device, comprising:
    sending, from the serving base station to each of the plurality of neighbouring base stations, a pre-handover procedure detection request for the neighbouring base station to attempt to detect the mobile device by an identity indicator of the mobile device provided by the serving base station to the neighbouring base station in the request and to return detection data representing the respective base station's ability to detect the mobile device outside of a handover procedure;
    receiving, from at least a subset of said neighbouring base stations, detection data representing the respective base station's ability to detect the mobile device by the respective base station listening for a transmission made by the mobile device and attributable to the mobile device based on the identity indicator; and
    sending cell identity data, from the serving base station to the mobile device, representing one or more handover candidate base stations for the mobile device to monitor for possible handover procedure initiation by measuring signal strengths of the one or more candidate base stations.

2. The method of claim 1, further comprising:
    receiving data, from the mobile device, indicating an unsatisfactory signal level from the serving base station, the receipt of the data indicating the unsatisfactory signal level from the serving base station triggering the sending of the request, the receiving the detection data and the sending the cell identity data.

3. The method of claim 1, wherein detection data is received periodically in response to sending said request to said plurality of neighbouring bases stations.

4. The method of claim 1, wherein the step of sending a request is carried out to each base station of a predetermined list of neighbouring base stations located in the vicinity of the serving base station.

5. The method of claim 1, comprising the step of sending identity data of a plurality of mobile devices currently served by the serving base station to said plurality of base stations, which identity data includes said identity indicator.

6. The method of claim 1, wherein said cell identity data comprises data representing a value indicator, dependent on said detection data, for at least a number of said neighbouring base stations.

7. The method of claim 4, wherein said cell identity data comprises a value indicator for each neighbouring base stations of said list.

8. The method of claim 6, wherein said cell identity data comprises value indicators for said subset of neighbouring base stations.

9. The method of claim 1, comprising:
evaluating said detection data to determine suitable candidates for handover; and
sending cell identity data only for determined candidate base stations.

10. The method of claim 9, wherein said cell identity data comprises a value indicator for at least some of the candidate base stations.

11. The method of claim 1, wherein the received detection data comprises a measurement on signal quality or signal strength, as detected by the base station sending the detection data.

12. The method of claim 6, wherein said value indicator represents a level of signal quality or signal strength.

13. A base station in a heterogeneous radio communications system, comprising:
a radio transceiver for radio communication with mobile devices,
a communications interface for communication with other base stations of the system that neighbour the base station, and
a control system configured to identify base station handover candidates for a mobile device from a plurality of said neighbouring bases stations, including controlling the base station to:
send, to each of the plurality of neighbouring base stations, a pre-handover procedure detection request for the neighbouring base station to attempt to detect the mobile device by an identity indicator of the mobile device provided by the serving base station to the neighbouring base station in the request and to return detection data representing the respective base station's ability to detect the mobile device outside of a handover procedure;
receive, from at least a subset of said neighbouring base stations, detection data representing the respective base station's ability to detect the mobile device by the respective base station listening for a transmission made by the mobile device and attributable to the mobile device based on the identity indicator, and
send cell identity data to the mobile device, representing one or more handover candidate base stations for the mobile device to monitor for possible handover procedure initiation by measuring signal strengths of the one or more candidate base stations.

14. The base station of claim 13, configured to send the request to each base station of a predetermined list of neighbouring base stations located in the vicinity of the serving base station.

15. The base station of claim 13, configured to send identity data of a plurality of mobile devices currently served by the serving base station to said plurality of base stations, which identity data includes said identity indicator.

16. The base station of claim 13, wherein said cell identity data comprises data representing a value indicator, dependent on said detection data, for at least a number of said neighbouring base stations.

17. The base station of claim 13, configured to evaluate said detection data to determine suitable candidates for handover; and to send cell identity data only for determined candidate base stations.

18. The base station of claim 13, wherein said cell identity data comprises a value indicator for at least some of the candidate base stations.

* * * * *